(12) United States Patent
Chen (10) Patent No.: US 8,023,270 B2
(45) Date of Patent: Sep. 20, 2011

(54) OPTOELECTRONIC TRANSCEIVER ASSEMBLY AND RELEASE MECHANISM EMPLOYED THEREIN

(75) Inventor: Jian-Ping Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 325 days.

(21) Appl. No.: 12/491,237

(22) Filed: Jun. 25, 2009

(65) Prior Publication Data

US 2010/0067199 A1    Mar. 18, 2010

(30) Foreign Application Priority Data

Sep. 12, 2008  (CN) .......................... 2008 1 0304489

(51) Int. Cl.
*H05K 7/12* (2006.01)
(52) U.S. Cl. ........ 361/747; 361/726; 361/730; 361/740; 439/372; 385/53
(58) Field of Classification Search .................. 361/726, 361/732, 740, 747, 759, 801; 439/160, 372; 385/53, 92
See application file for complete search history.

(56) References Cited

U.S. PATENT DOCUMENTS

| 6,771,511 | B2 * | 8/2004 | Bui ................................ 361/728 |
| 6,908,323 | B2 * | 6/2005 | Ice ................................. 439/160 |
| 6,929,403 | B1 | 8/2005 | Arciniegas et al. |
| 7,004,647 | B2 * | 2/2006 | Malagrino et al. ............. 385/92 |
| 7,212,410 | B2 * | 5/2007 | Larson .......................... 361/726 |
| 7,351,090 | B1 * | 4/2008 | Moore .......................... 439/372 |
| 7,352,590 | B2 * | 4/2008 | Wu et al. ....................... 361/754 |
| 2010/0046954 | A1 * | 2/2010 | Liu et al. ....................... 398/135 |

FOREIGN PATENT DOCUMENTS

CN           1825151 A     8/2006

* cited by examiner

*Primary Examiner* — Dameon Levi
(74) *Attorney, Agent, or Firm* — Altis Law Group, Inc.

(57) ABSTRACT

An optoelectronic transceiver module includes a cage, a transceiver module, and a release mechanism. The release mechanism includes a latch and a trigger. The latch pivotally attaches to the transceiver module with a first pivot. The latch includes a latch block projecting from a first end of the latch operable to be received in the cage. The trigger pivotally attaches to a second end of the latch with a second pivot. The trigger includes a cam mechanism around the second pivot. When the transceiver module is received in the cage, the first end of the latch separates from the transceiver module. When the trigger rotates about the second pivot, the cam mechanism drives the second end of the latch apart from the transceiver module, and the first end of the latch moves correspondingly toward the transceiver module and the latch block withdraws from the cage.

14 Claims, 7 Drawing Sheets

OPTOELECTRONIC TRANSCEIVER ASSEMBLY AND RELEASE MECHANISM EMPLOYED THEREIN

BACKGROUND

1. Technical Field

The present disclosure relates to fiber-optic communications, and in particular to an optoelectronic transceiver assembly and release mechanism.

2. Description of Related Art

Optoelectronic transceiver modules provide bi-directional transmission of data between an electrical interface and an optical data link. The transceiver module receives electrically encoded data signals, which are converted into optical signals and transmitted over the optical data link. The transceiver module also receives optically encoded data signals, which are converted into electrical signals and transmitted onto the electrical interface.

The optoelectronic transceiver module is often retained in a cage. The cage conventionally comprises a spring means located in a rear portion thereof. When the optoelectronic transceiver module is withdrawn from the cage, a release mechanism forces a fixed latch of the optoelectronic transceiver module out from a retaining hole defined in a retaining tab of the cage. The fixed latch is released from the retaining tab. The optoelectronic module is then ejected from the cage by the spring means.

It is thus desirable to provide a new release mechanism and an optoelectronic transceiver module using the release mechanism.

DETAILED DESCRIPTION

Figure 1:
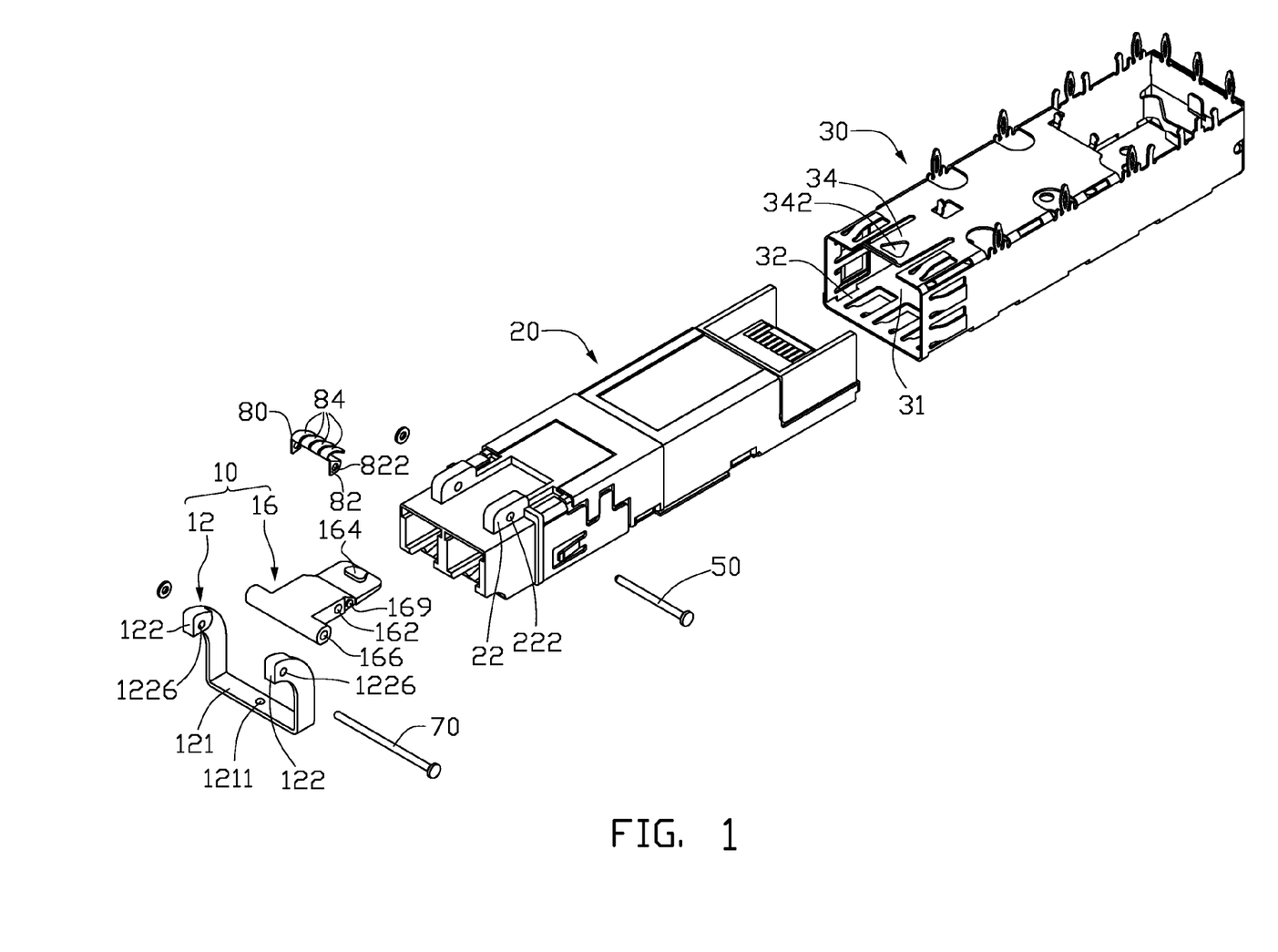
FIG. 1 is an exploded perspective view of an optoelectronic transceiver assembly in accordance with the disclosure.
Figure 2:
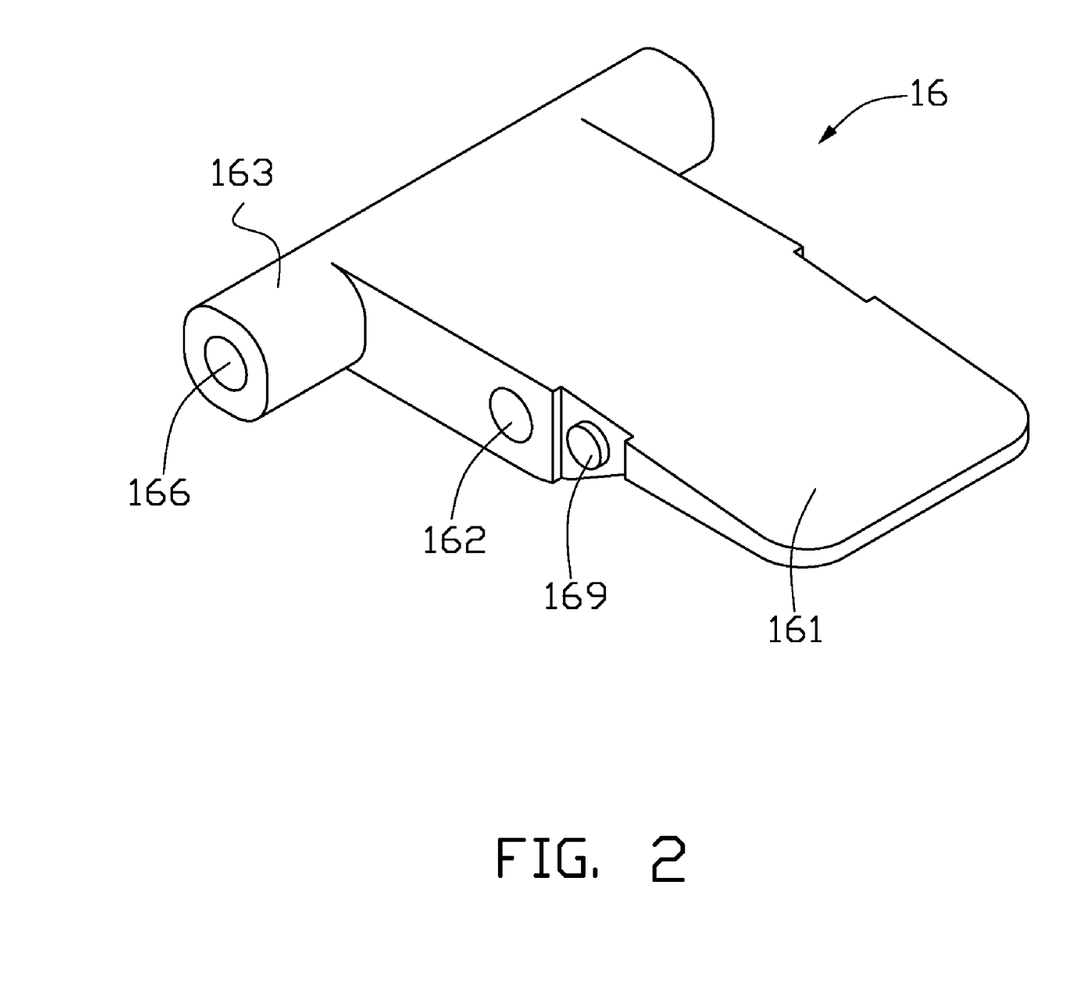
FIG. 2 is an enlarged, perspective view of a latch of a release mechanism of the optoelectronic transceiver assembly of FIG. 1.
Figure 3:
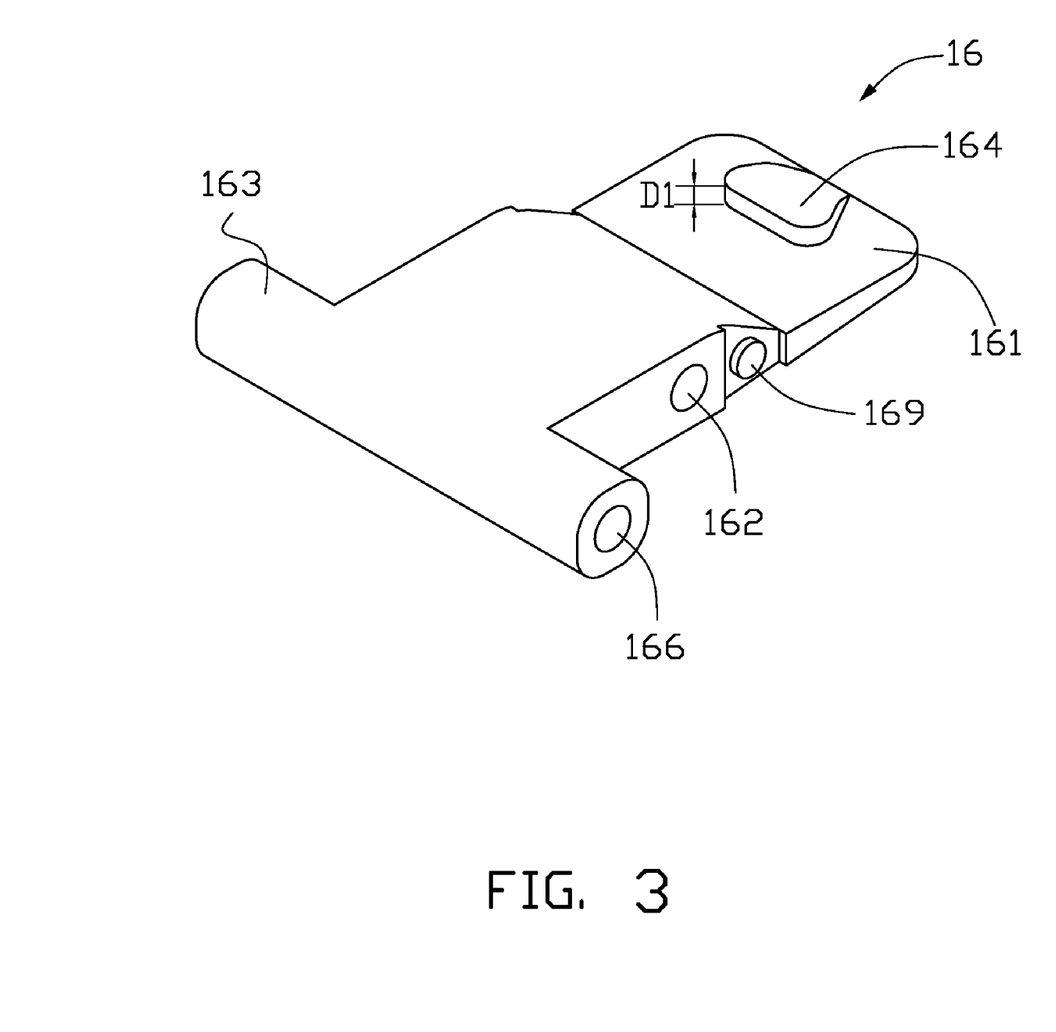
FIG. 3 is similar to FIG. 2, viewed from another aspect.

Referring to FIG. 1, an optoelectronic transceiver assembly according to the present disclosure comprises a cage 30, a transceiver module 20, and a release mechanism 10.

The cage 30 defines a receiving space 31 therein with an opening 32 at a front part of the cage 30, and a retaining tab 34. The retaining tab 34 is an inwardly elastic metal sheet, and defines a retaining hole 342 therein. The transceiver module 20 is received in the receiving space 31 of the cage 30 through the opening 32. A pair of securing portions 22, each defining a positioning hole 222, project from the transceiver module 20 and are separated from each other, wherein the pair of positioning holes 222 are coaxial to each other.

The release mechanism 10 includes a trigger 12 and a latch 16. The latch 16 is located between the pair of securing portions 22 of the transceiver module 20 and pivotally attached to the pair of securing portions 22. The latch 16 defines a first through hole 162 horizontally extending through a middle portion of the latch 16 and in communication with the pair of positioning holes 222 of the pair of securing portions 22 after assembly. The first through hole 162 defines a first pivot A1. A pin 50 passes through the pair of positioning holes 222 and the first through hole 162 to pivotally attach the latch 16 to the pair of securing portions 22.

Referring to FIG. 2-FIG. 3 and FIG. 5-FIG. 7, the latch 16 includes a first end 161 and a second end 163 opposite to the first end 161. The first end 161 is disposed between the transceiver module 20 and the retaining tab 34 of the cage 30, and can rotate about the first pivot A1. The first end 161 includes a latch block 164 having a height D1 operable to latch in the retaining hole 342 of the retaining tab 34. The second end 163 defines a second through hole 166 parallel with the first through hole 162. The second through hole 166 defines a second pivot A2. When the latch block 164 is latched in the retaining hole 342 of the retaining tab 34, the transceiver module 20 is latched in the cage 30, and a distance D2 between the first end 161 and the transceiver module 20 is greater than the height D1 of the latch block 164. Therefore, when the first end 161 rotates to contact the transceiver module 20, the latch block 164 withdraws from the retaining hole 342 of the retaining tab 34, and the transceiver module 20 is released from the cage 30.

Figure 4:
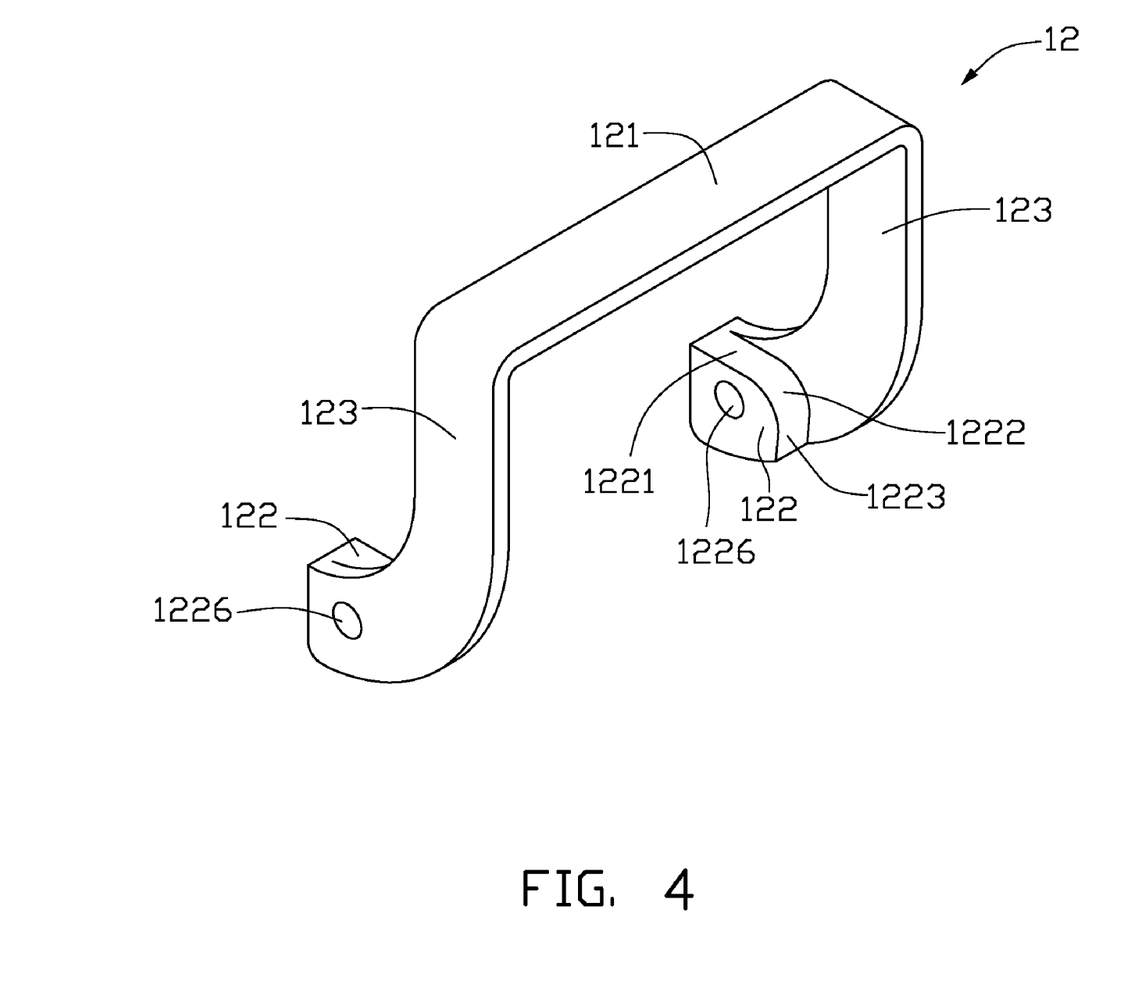
FIG. 4 is an enlarged, perspective view of a trigger of the release mechanism of the optoelectronic transceiver assembly of FIG. 1.
Figure 5:
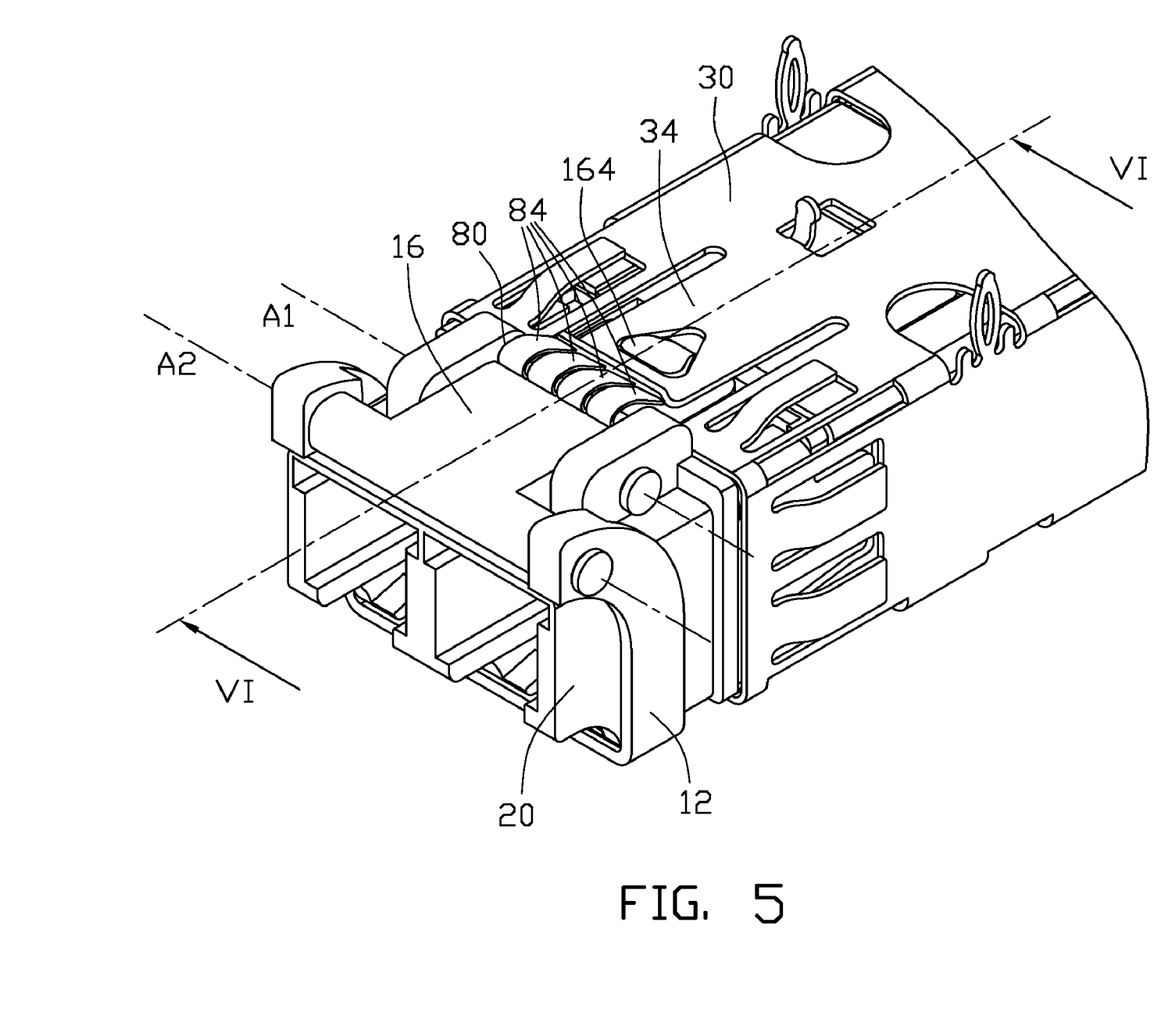
FIG. 5 is a cutout, assembled perspective view of the optoelectronic transceiver assembly of FIG. 1, showing the release mechanism in a latched position.

The trigger 12 includes a cam mechanism (not labeled) around the second pivot A2. The cam mechanism is pivotally attached to the second end 163 of the latch 16. Referring to FIG. 4, in this embodiment, the trigger 12 further includes a handle 121 that can be grasped by a user in order to reposition the trigger 12 and remove the transceiver module 20 from the cage 30, and a pair of connecting arms 123 vertically extending from two ends of the handle 121. The cam mechanism includes two cams 122 formed on free ends of the pair of connecting arms 123, respectively and opposite to each other. Each of the two cams 122 defines a hole 1226. The pair of connecting arms 123 are located on two sides of the second end 163 of the latch 16 with the holes 1226 of the two cams 122 being in communication with the second through hole 166 of the second end 163. A pin 70 passes through the holes 1226 of the cams 122 and the second through hole 166 to pivotally attach the trigger 12 to the latch 16.

Each of the two cams 122 includes a first contacting surface 1221, a second contacting surface 1223 and a curved surface 1222 connecting the first contacting surface 1221 and the second contacting surface 1223. A distance between the second pivot A2 and the second contacting surface 1223 is greater than that between the second pivot A2 and the first contacting surface 1221. The first contacting surface 1221 is opposite and parallel to the handle 121, and perpendicular to the second contacting surface 1223. The first contacting surface 1221 of the cam 122 faces the transceiver module 20 such that the latch block 164 is latched in the retaining hole 342 of the retaining tab 34 (shown in FIG. 6), correspondingly, the second contacting surface 1223 of the cam 122 contacts the transceiver module 20 such that the latch block 164 withdraws from the retaining hole 342 of the retaining tab 34 (shown in FIG. 7).

In this embodiment, the trigger 12 further includes a protrusion 1211 extending from the handle 121 and opposite to the transceiver module 20. When the transceiver module 20 is latched in the cage 30, the protrusion 1211 engages with a recess 28 defined in the transceiver module 20 so as to secure the trigger 12 in a latched position.

Figure 6:
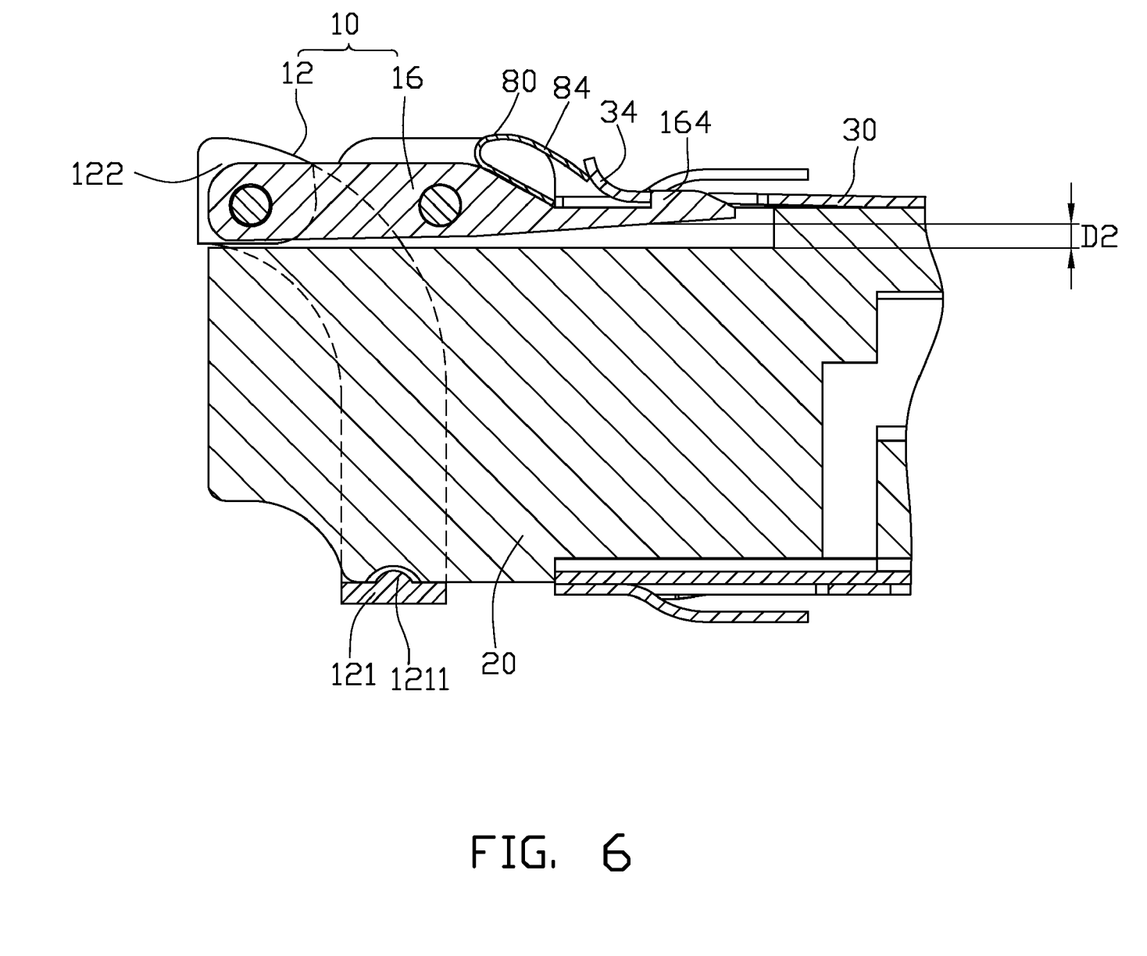
FIG. 6 is a cross-section along line VI-VI of FIG. 5.
Figure 7:
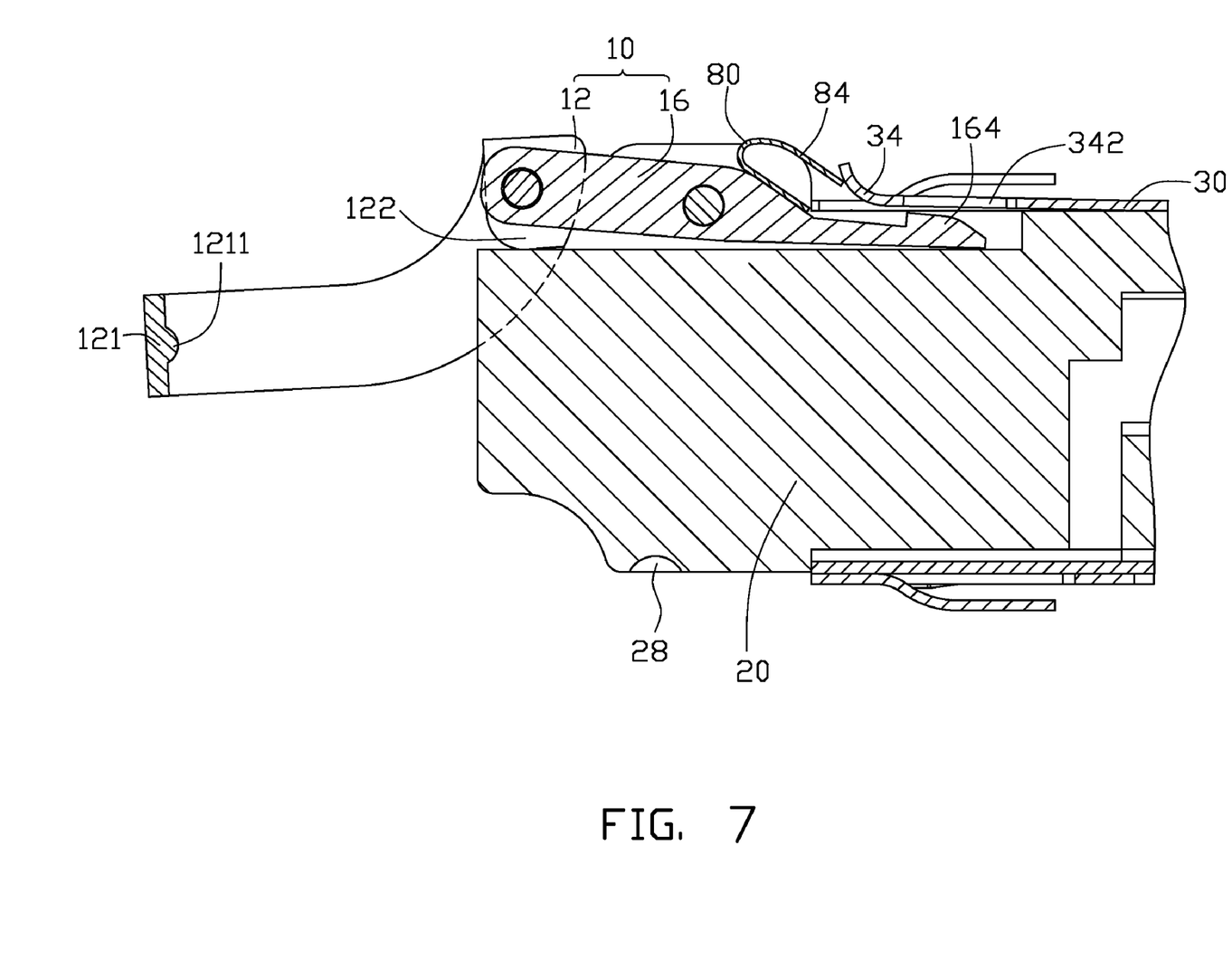
FIG. 7 is similar to FIG. 6, showing the release mechanism in an unlatched position.

During assembly, the release mechanism 10 is installed on the transceiver module 20 with the second contacting surfaces 1223 of the cams 122 contacting the transceiver module 20 before the transceiver module 20 is installed in the cage 30. When the transceiver module 20 is inserted into the cage 30 as shown in FIG. 7, rotation of the handle 121 of the trigger 12 rotates the cams 122 about the second pivot A2. During the rotation, the second end 163 of the latch 16 can rotate about the first pivot A1 to approach the transceiver module 20. When the cams 122 are rotated such that the first contacting surface 1221 is opposite to transceiver module 20, the latch block 164 of the first end 161 of the latch 16 is rotated to latch into the retaining hole 342, and the protrusion 1211 of the handle 121 of the trigger 12 latches into the recess 28 of the transceiver module 20, as shown in FIG. 6. Thus, the release mechanism 10 is in a latched position, and the transceiver module 20 is latched in the cage 30.

When the release mechanism 10 is in the latched position, rotation of the handle 121 of the trigger 12 may cause the cams 122 to rotate about the second pivot A2, with the second end 163 of the latch 16 simultaneously rotating about the first pivot A1 away from the transceiver module 20. Therefore, the latch block 164 of the first end 161 of the latch 16 rotates about the first pivot A1 to withdraw from the retaining hole 342. Thus, the release mechanism 10 is in an unlatched position and the transceiver module 20 can be removed from the cage 30.

In light of the foregoing, when the transceiver module 20 is received in the receiving space 31 of the cage 30, the first end 161 of the latch 16 separates from the transceiver module 20. When the trigger 12 rotates about the second pivot A2, the cam mechanism drives the second end 163 of the latch 16 away from the transceiver module 20. Correspondingly, the first end 161 of the latch 16 moves toward the transceiver module 20, and the latch block 164 withdraws from the retaining hole 342 of the retaining tab 34.

The release mechanism 10 further includes a shielding member 80 disposed between the latch 16 and the cage 30 to repel electromagnetic interference (EMI) generated by electronic components received within the cage 30. The latch 16 includes a pair of fixing pins 169 projecting from two side walls of the latch 16. The shielding member 80 includes a pair of fixing sheets 82 each defining a hole 822 and a plurality of elastic portions 84. The shielding member 80 is installed on the latch 16 with the holes 822 of the fixing sheets 82 mating with the fixing pins 169 of the latch 16 and the plurality of elastic portions 84 abutting the retaining tab 34 of the cage 30.

While exemplary embodiments have been described, it should be understood that they have been presented by way of example only and not by way of limitation. The breadth and scope of the disclosure should not be limited by the described exemplary embodiments, but only in accordance with the following claims and their equivalents.

What is claimed is:

1. An optoelectronic transceiver assembly, comprising:
    a cage defining a receiving space therein with an opening, and comprising a retaining tab, wherein the retaining tab defines a retaining hole therein;
    a transceiver module received in the receiving space through the opening; and
    a release mechanism, comprising:
        a latch pivotally attached to the transceiver module with a first pivot, the latch comprising a latch block projecting from a first end of the latch operable to be received in the retaining hole of the retaining tab, wherein the first pivot is located between the latch block and the second end; and
        a trigger rotatably attached to a second end of the latch with a second pivot, the trigger comprising a cam mechanism around the second pivot;
    wherein when the transceiver module is received in the receiving space of the cage, the first end of the latch separates from the transceiver module, and when the trigger rotates about the second pivot, the cam mechanism drives the second end of the latch apart from the transceiver module, and the first end of the latch correspondingly moves toward the transceiver module and the latch block withdraws from the retaining hole of the retaining tab.

2. The optoelectronic transceiver assembly as claimed in claim 1, wherein the trigger comprises a handle and a pair of connecting arms vertically extending from two ends of the handle, and the cam mechanism comprises two cams formed on free ends of the pair of connecting arms, respectively.

3. The optoelectronic transceiver assembly as claimed in claim 2, wherein each of the two cams comprises a first contacting surface, a second contacting surface and a curved surface connecting the first and second contacting surfaces, wherein when the transceiver module is received in the receiving space of the cage safely, the first contacting surface faces the transceiver module; and when the cam mechanism drives the second end of the latch apart from the transceiver module, the second contacting surface contacts the transceiver module.

4. The optoelectronic transceiver assembly as claimed in claim 3, wherein the first contacting surface is opposite and parallel to the handle, and perpendicular to the second contacting surface.

5. The optoelectronic transceiver assembly as claimed in claim 3, wherein the trigger further comprises a protrusion extending from the handle and towards the first contacting surface, wherein when the transceiver module is latched in the cage, the protrusion engages a recess defined in the transceiver module so as to secure the trigger.

6. The optoelectronic transceiver assembly as claimed in claim 1, wherein the release mechanism further comprises a shielding member disposed between the latch and the cage to repel electromagnetic interference (EMI).

7. The optoelectronic transceiver assembly as claimed in claim 6, wherein the shielding member comprises a plurality of elastic portions abutting the retaining tab of the cage.

8. A release mechanism operable to release a transceiver module from a cage defining a receiving space therein with an opening, and comprising a retaining tab, wherein the retaining tab defines a retaining hole therein, and the transceiver module is received in the receiving space through the opening, the release mechanism comprising:
    a latch pivotally attached to the transceiver module with a first pivot, the latch comprising a latch block projecting from a first end of the latch operable to be received in the retaining hole of the retaining tab, wherein the first pivot is located between the latch block and the second end; and
    a trigger rotatably attached to a second end of the latch with a second pivot, the trigger comprising a cam mechanism around the second pivot;
    wherein when the transceiver module is received in the receiving space of the cage, the first end of the latch separates from the transceiver module, and when the trigger rotates about the second pivot, the cam mechanism drives the second end of the latch apart from the transceiver module, and the first end of the latch correspondingly moves toward the transceiver module and the latch block withdraws from the retaining hole of the retaining tab.

9. The release mechanism as claimed in claim 8, wherein the trigger comprises a handle and a pair of connecting arms vertically extending from two ends of the handle, and the cam mechanism comprises two cams formed on free ends of the pair of the connecting arms, respectively.

10. The release mechanism as claimed in claim 9, wherein each of the two cams comprises a first contacting surface, a second contacting surface and a curved surface connecting the first and second contacting surfaces, wherein when the transceiver module is received in the receiving space of the cage safely, the first contacting surface faces the transceiver module; and when the cam mechanism drives the second end of the latch apart from the transceiver module, the second contacting surface contacts the transceiver module.

11. The release mechanism as claimed in claim 10, wherein the first contacting surface is opposite and parallel to the handle, and perpendicular to the second contacting surface.

12. The release mechanism as claimed in claim 10, wherein the trigger further comprises a protrusion extending from the handle and towards the first contacting surface, wherein when the transceiver module is latched in the cage, the protrusion engages with a recess defined in the transceiver module so as to secure the trigger.

13. The release mechanism as claimed in claim 8, further comprising a shielding member disposed between the latch and the cage to repel electromagnetic interference (EMI).

14. The release mechanism as claimed in claim 13, wherein the shielding member comprises a plurality of elastic portions abutting the retaining tab of the cage.

* * * * *